United States Patent
Iijima et al.

(10) Patent No.: US 11,577,344 B2
(45) Date of Patent: Feb. 14, 2023

(54) SOLDER ALLOY

(71) Applicant: SENJU METAL INDUSTRY CO., LTD., Tokyo (JP)

(72) Inventors: Yuuki Iijima, Tokyo (JP); Shunsaku Yoshikawa, Tokyo (JP); Takashi Saito, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 17/387,282

(22) Filed: Jul. 28, 2021

(65) Prior Publication Data

US 2022/0032406 A1 Feb. 3, 2022

(30) Foreign Application Priority Data

Jul. 31, 2020 (JP) .............................. JP2020-130472

(51) Int. Cl.
| | | |
|---|---|---|
| C22C 13/02 | (2006.01) | |
| B23K 35/26 | (2006.01) | |
| B23K 35/02 | (2006.01) | |
| B23K 103/08 | (2006.01) | |

(52) U.S. Cl.
CPC .......... *B23K 35/262* (2013.01); *B23K 35/025* (2013.01); *C22C 13/02* (2013.01); *B23K 2103/08* (2018.08)

(58) Field of Classification Search
CPC .................................................... B23K 35/262
See application file for complete search history.

(56) References Cited

U.S. PATENT DOCUMENTS

| | | |
|---|---|---|
| 2015/0136461 A1 | 5/2015 | Imamura et al. |
| 2015/0221606 A1 | 8/2015 | Yamanaka et al. |
| 2016/0056570 A1 | 2/2016 | Yoshikawa et al. |
| 2016/0279741 A1 | 9/2016 | Ukyo et al. |
| 2017/0014955 A1 | 1/2017 | Ueshima et al. |
| 2017/0355043 A1 | 12/2017 | Ikeda et al. |
| 2018/0029169 A1 | 2/2018 | Arai et al. |
| 2018/0214989 A1 | 8/2018 | Ikeda et al. |
| 2019/0030681 A1 | 1/2019 | Shibutani |
| 2019/0389012 A1 | 12/2019 | Ribas et al. |
| 2020/0061757 A1 | 2/2020 | Nishino et al. |
| 2020/0070287 A1* | 3/2020 | Mutuku ............... B23K 35/264 |
| 2020/0114475 A1 | 4/2020 | Izumita et al. |
| 2021/0283727 A1 | 9/2021 | Rant et al. |

FOREIGN PATENT DOCUMENTS

| | | |
|---|---|---|
| CN | 107427969 | 12/2017 |
| CN | 107848078 | 3/2018 |
| CN | 110430968 | 11/2019 |
| EP | 1 930 117 | 6/2008 |
| EP | 2 868 424 | 5/2015 |
| JP | 2006-524572 | 11/2006 |
| JP | 2016-113665 | 6/2016 |
| JP | 2017-127907 | 7/2017 |
| JP | 2017-170524 | 9/2017 |
| JP | 6192797 | 9/2017 |
| JP | 2018-83211 | 5/2018 |
| JP | 2019-520985 | 7/2019 |
| JP | 6624322 | 12/2019 |
| JP | 2020-104169 | 7/2020 |
| JP | 2020-114604 | 7/2020 |
| KR | 10-2014-0117707 | 10/2014 |
| KR | 10-2016-0019977 | 2/2016 |
| TW | 201838745 | 11/2018 |
| TW | 202024345 | 7/2020 |
| WO | 2015/152387 | 10/2015 |
| WO | 2019/053866 | 3/2019 |

OTHER PUBLICATIONS

Decision to Grant a Patent dated Dec. 15, 2020 in Japanese Application No. 2020-130472, with English translation.
Search Report dated Oct. 8, 2021 in European Patent Application No. 21188466.3.
Office Action dated Oct. 26, 2021 in Indian Patent Application No. 202144033479.
Notice of Allowance dated Sep. 24, 2021 in corresponding Korean Patent Application No. 10-2021-0098965.

* cited by examiner

*Primary Examiner* — Jophy S. Koshy

(74) *Attorney, Agent, or Firm* — Wenderoth, Lind & Ponack, L.L.P.

(57) ABSTRACT

A solder alloy has an alloy composition consisting of, in mass %, Ag: 0 to 4%, Cu: 0.1 to 1.0%, Ni: 0.01 to 0.3%, Sb: 5.1 to 7.5%, Bi: 0.1 to 4.5%, Co: 0.001 to 0.3%, P: 0.001 to 0.2%, and the balance being Sn.

4 Claims, No Drawings

SOLDER ALLOY

CROSS-REFERENCE TO RELATED APPLICATIONS

This application claims the benefit of Japanese Priority Patent Application JP 2020-130472 filed on Jul. 31, 2020, the entire contents of which are incorporated herein by reference.

FIELD

The present technology relates to a solder alloy, in particular, a lead-free solder alloy.

BACKGROUND AND SUMMARY

In recent years, car electronics has been improved for motor vehicles, and motor vehicles are shifting from gasoline vehicles to hybrid vehicles and electric vehicles. Hybrid vehicles and electric vehicles are equipped with an in-vehicle electronic circuit that has electronic components soldered to a printed circuit board. The in-vehicle electronic circuit used to be disposed in a vehicle interior in a relatively gentle vibration environment, but with the expansion in application, has been mounted directly in an engine room, in an oil chamber of a transmission, or even on a mechanical device.

As described above, with the expansion in mounting region, the in-vehicle electronic circuit has been mounted in a place that is subjected to various external loads such as temperature variations, impacts, and vibrations. For example, an in-vehicle electronic circuit mounted in an engine room may be exposed to high temperatures of 125° C. or higher during engine operation. In contrast, when the engine is stopped, the circuit is exposed to low temperatures of −40° C. or lower in the case of cold regions. When the in-vehicle electronic circuit is exposed to such temperature variations, stress is concentrated on the joint because of a difference in thermal expansion coefficient between the electronic component and the printed circuit board. For this reason, the use of a conventional Sn-3Ag-0.5Cu solder alloy may cause the joint to be broken, and solder alloys that keep the joint from being broken even in environments with severe temperature variations have been studied.

JP 2019-520985 A discloses a solder alloy including 8 to 15 mass % of Sb, 0.05 to 5 mass % of Bi, 0.1 to 10 mass % of Ag, 0.1 to 4 mass % of copper, up to 1 mass % of Ni, and up to 1 mass % of Co, and optionally including up to 1 mass % of P.

Now, there is a reflow method as a typical soldering method for constituent components (hereinafter, referred to as electronic components or simply as components) such as printed circuit boards and electronic components for use in electronic devices. The reflow method is a method of soldering by disposing a solder only on a required site of a component, and then heating with a heating device such as a reflow furnace, an infrared irradiation device, or a laser irradiation device. This reflow method is not only excellent in productivity but also capable of soldering with excellent reliability in that no solder adheres to unrequired sites, and thus is often employed for soldering electronic components that require high reliability today.

Examples of the form of the solder for use in the reflow method include a solder paste and a preform solder. The solder paste is obtained by kneading a viscous flux and a powder solder, and is applied to a soldered part of an electronic component by printing or discharging the paste. The flux for use in the solder paste is obtained by dissolving solid contents such as a pine resin and an activator in a solvent, and a flux residue may thus adhere to the soldered part after soldering with the solder paste. When the flux residue absorbs moisture in the atmosphere, the soldered part may have corrosion products generated or undergo a decrease in insulation resistance. Thus, for the component soldered with the solder paste, the flux residue may be washed.

Then, a preform solder is used as a bonding method that generates no flux residue. The preform solder is (preform) solder molded in advance into a shape that conforms to a soldered part, such as a pellet or a washer. The reflow method with the use of the preform solder is not required to use any paste flux, and thus capable of keeping flux residues from being generated.

Now, depending on the alloy compositions of solder alloys, cracks (also referred to as "edge cracks") may be generated in a rolling step for preparing a preform solder, thereby making it difficult to perform processing into the shape of a preform. In addition, the preparation of a powder solder for a solder paste may also have a problem with workability. In this regard, JP 2019-520985 A fails to discuss at least the workability of the solder alloy.

It is desirable to provide a solder alloy with more excellent creep resistance and favorable workability.

A solder alloy according to an aspect of the present technology has an alloy composition consisting of, in mass %, Ag: 0 to 4%, Cu: 0.1 to 1.0%, Ni: 0.01 to 0.3%, Sb: 5.1 to 7.5%, Bi: 0.1 to 4.5%, Co: 0.001 to 0.3%, P: 0.001 to 0.2%, and the balance being Sn.

DETAILED DESCRIPTION OF NON-LIMITING EXAMPLE EMBODIMENTS

A solder alloy according to a first aspect of an embodiment has an alloy composition consisting of, in mass %, Ag: 0 to 4%, Cu: 0.1 to 1.0%, Ni: 0.01 to 0.3%, Sb: 5.1 to 7.5%, Bi: 0.1 to 4.5%, Co: 0.001 to 0.3%, P: 0.001 to 0.2%, and the balance being Sn.

A solder alloy according to a second aspect of the embodiment is the solder alloy according to the first aspect, where the alloy composition satisfies the following relationships (1) and (2).

$$0.50 \leq (Ag+Cu) \times (Sb+Bi) \times (Ni+Co+P) < 7.0 \qquad (1)$$

$$0.17 \leq Co/P \leq 65 \qquad (2)$$

In the relationships (1) and (2), Ag, Cu, Sb, Bi, Ni Co, and P each represent the content (mass %) thereof in the alloy composition.

A preform according to a third aspect of the embodiment has the solder alloy according to the first or second aspect.

A paste according to a fourth aspect of the embodiment has the solder alloy according to the first or second aspect.

A solder joint according to a fifth aspect of the embodiment has the solder alloy according to the first or second aspect.

Specific examples of the embodiment will be described below in detail. It is to be noted that in the present specification, "%" related to the alloy composition of the solder alloy is "mass %" unless otherwise specified. In addition, in the present specification, "AA to BB" (AA and BB are both numbers.) means "AA or more and BB or less" unless otherwise specified.

1. Solder Alloy

A solder alloy according to an embodiment has an alloy composition consisting of, in mass %, Ag: 0 to 4%, Cu: 0.1 to 1.0%, Ni: 0.01 to 0.3%, Sb: 5.1 to 7.5%, Bi: 0.1 to 4.5%, Co: 0.001 to 0.3%, P: 0.001 to 0.2%, and the balance being Sn.

The alloy composition of the solder alloy according to the present embodiment may satisfy the following relationships (1) and (2).

$$0.50 \leq (Ag+Cu) \times (Sb+Bi) \times (Ni+Co+P) < 7.0 \qquad (1)$$

$$0.17 \leq Co/P \leq 65 \qquad (2)$$

In the relationships (1) and (2), Ag, Cu, Sb, Bi, Ni, Co, and P each represent the content (mass %) thereof in the alloy composition.

The constituent reasons for each element in the solder alloy according to the present embodiment will be described below.

(A) Ag: 0 to 4%

Ag improves the solder wettability, and improves the creep resistance with enhancement of solder deposition by a eutectic network of an $Ag_3Sn$ compound with Sn. It is not essential to contain Ag, but in the case of containing Ag, the lower limit of the content of Ag is preferably 2% or more, more preferably 3% or more.

In contrast, when the content of Ag exceeds 4%, the creep resistance is degraded by the coarse $Ag_3Sn$ compound crystallized as primary crystals. In addition, the melting point is increased. In addition, the workability is degraded. Accordingly, the upper limit of the content of Ag is 4% or less, more preferably 3.8% or less.

(B) Cu: 0.1 to 1.0%

Cu improves the solder wettability and improves the creep resistance with enhancement of deposition. When the content of Cu is less than 0.1%, the creep resistance is not improved. Accordingly, the lower limit of the content of Cu is 0.1% or more, more preferably 0.25% or more, even more preferably 0.45% or more.

In contrast, when the content of Cu exceeds 1%, the creep resistance is degraded by the coarse $Cu_6Sn_5$ compound crystallized as primary crystals. In addition, the melting point is increased. In addition, the workability is degraded. Accordingly, the upper limit of the content of Cu is 1% or less, more preferably 0.9% or less, even more preferably 0.85% or less.

(C) Ni: 0.01 to 0.3%

Ni improves the creep resistance with dispersion and deposition, in the solder bulk, of a SnNi compound produced by reacting with Sn, for producing a microstructure. When the content of Ni is less than 0.01%, the creep resistance is not improved. Accordingly, the lower limit of the content of Ni is 0.01% or more, more preferably 0.02% or more, even more preferably 0.03% or more.

In contrast, when the content of Ni exceeds 0.3%, the melting point is increased. In addition, the deposition of a coarse SnNi compound degrades the creep resistance and the workability. Accordingly, the upper limit of the content of Ni is 0.3% or less, more preferably 0.2% or less, even more preferably 0.1% or less.

(D) Sb: 5.1 to 7.5%

Sb improves the creep resistance with increase in solid solution. When the Sb content is less than 5.1%, the creep resistance is not improved. Accordingly, the lower limit of the content of Sb is 5.1% or more, more preferably 5.3% or more.

In contrast, when the content of Sb exceeds 7.5%, the ductility is decreased, and the workability is degraded (working defects are caused, such as edge cracks). In addition, the melting point is increased. Accordingly, the upper limit of the content of Sb is 7.5% or less, more preferably 7.2% or less, even more preferably 6.8% or less.

(E) Bi: 0.1 to 4.5%

Bi improves the creep resistance with increase in solid solution. When the content of Bi is less than 0.1%, the creep resistance is not improved. Accordingly, the lower limit of the content of Bi is 0.1% or more, more preferably 0.2% or more.

In contrast, when the content of Bi exceeds 4.5%, the ductility is decreased, and the workability is degraded (working defects are caused, such as edge cracks). Accordingly, the upper limit of the content of Bi is 4.5% or less, more preferably 4% or less, and even more preferably 3% or less.

(F) Co: 0.001 to 0.3%

Co improves the creep resistance with dispersion and deposition, in the solder bulk, of a SnCo compound produced by reacting with Sn, for producing a microstructure. When the content of Co is less than 0.001%, no synergistic effect with Ni is produced. Accordingly, the lower limit of the content of Co is 0.001% or more.

In contrast, when the content of Co exceeds 0.3%, the melting point is increased. In addition, the deposition of a coarse SnCo compound degrades the creep resistance and the workability. Accordingly, the upper limit of the content of Co is 0.3% or less, more preferably 0.2% or less, even more preferably 0.1% or less.

(G) P: 0.001 to 0.2%

P improves the creep resistance with dispersion and deposition, in the solder bulk, of a SnP compound or a CoP compound, for producing a microstructure. When the content of P is less than 0.001%, no addition effect is achieved. Accordingly, the lower limit of the content of P is 0.001% or more.

In contrast, when the content of P exceeds 0.2%, the melting point is increased. In addition, the deposition of a coarse SnP compound degrades the creep resistance and the workability. Accordingly, the upper limit of the content of P is 0.2% or less, more preferably 0.15% or less, even more preferably 0.1% or less.

$$(H)\ 0.50 \leq (Ag+Cu) \times (Sb+Bi) \times (Ni+Co+P) < 7.0 \qquad (1)$$

The relationship (1) is satisfied at the same time as the relationship (2), thereby further improving the creep resistance, the workability, and the melting point. The wettability of the solder is further improved with the increase in the total amount of Ag and Cu, and the creep resistance is further improved by the enhancement of deposition. In addition, with the increase in the total amount of Sb and Bi, the creep resistance is further improved with increase in solid solution. In addition, with the increase in the total amount of Ni, Co, and P, the creep resistance is further improved with dispersion and deposition, in the solder bulk, of a SnNi compound, a SnCo compound, or a SnP compound or a CoP compound, for producing a microstructure. The creep resistance, the workability, and the melting point are, however, all further improved by not only simply increasing each of the total amount of Ag and Cu, the total amount of Sb and Bi, and the total amount of Ni, Co, and P, but also maintaining the balance within a certain value. The lower limit of the relationship (1) is preferably 0.50 or more, more preferably 0.8 or more, even more preferably 0.95 or more.

The balance among the total amount of Ag and Cu, the total amount of Sb and Bi, and the total amount of Ni, Co, and P in the range of the relationship (1) further inhibits the formation of a coarse $Ag_3Sn$ compound or $Cu_6Sn_5$ compound, a SnNi compound, a SnCo compound, or a SnP compound to further improve the creep characteristics, and at the same time, keeps the melting point from increasing, and then achieves more appropriate ductility, thereby allowing the workability to be further improved. The upper limit of the relationship (1) is 7.0 or less, more preferably 6.5 or less, even more preferably 6.0 or less.

$$(I) 0.17 \leq Co/P \leq 65 \quad (2)$$

The relationship (2) is satisfied at the same time as the relationship (1), thereby further improving the creep resistance, the workability, and the melting point. The balance between the contents of Co and P affects the production of a CoP compound dispersed and deposited in the solder bulk. Accordingly, the lower limit of the relationship (2) is preferably 0.17 or more, more preferably 0.2 or more, even more preferably 0.4 or more. In contrast, the upper limit of the relationship (2) is preferably 65 or less, more preferably 51 or less, even more preferably 33.5 or less.

2. Preform

A preform according to an embodiment is obtained by molding (preforming) a solder alloy that has the above-described alloy composition into a shape that conforms to a soldered part. The shape of the preform is not particularly limited, and may be, for example, a ribbon shape, a square shape, a disk shape, a washer shape, a chip shape, a ball shape, or a wire shape. The preform may contain thereby high-melting-point metal particles (for example, Ni particles) that is higher in melting point than the solder alloy and likely to be wet to the molten solder.

3. Paste

A paste according to an embodiment is a mixture of a solder alloy powder that has the above-described alloy composition and a flux. The flux is not particularly limited as long as soldering can be performed by a conventional method, and may be obtained by appropriately blending a rosin, an organic acid, an activator, and a solvent that are commonly used. The blending ratios of the metal powder component and the flux component are not particularly limited, and for example, the metal powder component may be 80 to 90 mass %, and the flux component may be 10 to 20 mass %.

4. Solder Joint

A solder joint according to an embodiment includes a solder alloy that has the above-described alloy composition, and the solder joint is suitable for use in connection between an IC chip in a semiconductor package and a substrate (interposer) therefor, or connection between a semiconductor package and a printed wiring board. The "solder joint" herein refers to a joint of an electrode.

The method for forming the solder joint according to the present embodiment is not particularly limited, and the solder joint can be formed by a conventional reflow method or the like. As for the atmosphere in the case of solder bonding by a reflow method, the solder joint according to the present embodiment can be formed in an air atmosphere or a nitrogen atmosphere, as well as in a formic acid atmosphere or a hydrogen atmosphere for further improving the bondability.

The solder joint according to the present embodiment may be used in an in-vehicle electronic circuit or an ECU electronic circuit. It is to be noted that the "in-vehicle electronic circuit" refers to an electronic circuit mounted on a motor vehicle. In addition, the "ECU electronic circuit" refers to an electronic circuit provided in an engine control unit (ECU) that controls motor vehicle travel, in particular, the operation of an engine with a computer for improvement in fuel efficiency, among in-vehicle electronic circuits.

The "electronic circuit" is a system (system) that fulfill a target function as a whole in electronic engineering combination of multiple electronic components that each have a function. Examples of the electronic components constituting the electronic circuit include a chip resistance component, a multiple resistance component, QFP, QFN, a power transistor, a diode, and a capacitor. The electronic circuit with these electronic components built-in is provided on a substrate to constitute an electronic circuit device.

The substrate constituting the electronic circuit, for example, a printed wiring board is not particularly limited. The material thereof is also not particularly limited, but examples of the material include a heat-resistant plastic substrate (for example, FR-4 with high Tg and low CTE). The printed wiring board may be a printed circuit board that has a Cu land surface treated with an organic substance (OSP: organic surface protection) such as an amine or an imidazole.

EXAMPLES

Next, specific examples according to the present embodiment will be described. The present inventors measured the creep resistance, workability, and melting point of solder alloys with alloy compositions shown in Tables 1 and 2 by the following methods.

TABLE 1

| | Alloy Composition (mass %) | | | | | | | | Relationship (1) | Relationship (2) | Creep Resistance | Workability | Melting Point |
|---|---|---|---|---|---|---|---|---|---|---|---|---|---|
| | Sn | Ag | Cu | Ni | Sb | Bi | Co | P | | | | | |
| Example 1 | Bal. | 0 | 0.7 | 0.06 | 6.0 | 0.5 | 0.008 | 0.003 | X | ○ | ○ | ⊙ | ⊙ |
| Example 2 | Bal. | 3.4 | 0.7 | 0.06 | 6.0 | 0.5 | 0.008 | 0.003 | ○ | ○ | ⊙ | ⊙ | ⊙ |
| Example 3 | Bal. | 4 | 0.7 | 0.06 | 6.0 | 0.5 | 0.008 | 0.003 | ○ | ○ | ⊙ | ⊙ | ⊙ |
| Example 4 | Bal. | 3.4 | 0.1 | 0.06 | 6.0 | 0.5 | 0.008 | 0.003 | ○ | ○ | ⊙ | ⊙ | ⊙ |
| Example 5 | Bal. | 3.4 | 1.0 | 0.06 | 6.0 | 0.5 | 0.008 | 0.003 | ○ | ○ | ⊙ | ⊙ | ⊙ |
| Example 6 | Bal. | 3.4 | 0.7 | 0.01 | 6.0 | 0.5 | 0.008 | 0.003 | ○ | ○ | ⊙ | ⊙ | ⊙ |
| Example 7 | Bal. | 3.4 | 0.7 | 0.3 | 6.0 | 0.5 | 0.008 | 0.003 | X | ○ | ○ | ○ | ○ |
| Example 8 | Bal. | 3.4 | 0.7 | 0.06 | 5.1 | 0.5 | 0.008 | 0.003 | ○ | ○ | ⊙ | ⊙ | ⊙ |
| Example 9 | Bal. | 3.4 | 0.7 | 0.06 | 7.0 | 0.5 | 0.008 | 0.003 | ○ | ○ | ⊙ | ⊙ | ⊙ |
| Example 10 | Bal. | 3.4 | 0.7 | 0.06 | 7.5 | 0.5 | 0.008 | 0.003 | ○ | ○ | ⊙ | ⊙ | ⊙ |
| Example 11 | Bal. | 3.4 | 0.7 | 0.06 | 6.0 | 0.1 | 0.008 | 0.003 | ○ | ○ | ⊙ | ⊙ | ⊙ |
| Example 12 | Bal. | 3.4 | 0.7 | 0.06 | 6.0 | 2.5 | 0.008 | 0.003 | ○ | ○ | ⊙ | ⊙ | ⊙ |

TABLE 1-continued

| | Alloy Composition (mass %) | | | | | | | Relationship (1) | Relationship (2) | Creep Resistance | Workability | Melting Point |
|---|---|---|---|---|---|---|---|---|---|---|---|---|
| | Sn | Ag | Cu | Ni | Sb | Bi | Co | P | | | | | |
| Example 13 | Bal. | 3.4 | 0.7 | 0.06 | 6.0 | 4.5 | 0.008 | 0.003 | ○ | ○ | ⊙ | ⊙ | ⊙ |
| Example 14 | Bal. | 3.4 | 0.7 | 0.06 | 6.0 | 0.5 | 0.001 | 0.003 | ○ | ○ | ⊙ | ⊙ | ⊙ |
| Example 15 | Bal. | 3.4 | 0.7 | 0.06 | 6.0 | 0.5 | 0.05 | 0.003 | ○ | ○ | ⊙ | ⊙ | ⊙ |
| Example 16 | Bal. | 3.4 | 0.7 | 0.06 | 6.0 | 0.5 | 0.2 | 0.003 | X | X | ○ | ○ | ○ |
| Example 17 | Bal. | 3.4 | 0.7 | 0.06 | 6.0 | 0.5 | 0.008 | 0.001 | ○ | ○ | ⊙ | ⊙ | ⊙ |
| Example 18 | Bal. | 3.4 | 0.7 | 0.06 | 6.0 | 0.5 | 0.008 | 0.05 | ○ | X | ○ | ○ | ○ |
| Example 19 | Bal. | 3.4 | 0.7 | 0.06 | 6.0 | 0.5 | 0.008 | 0.2 | X | X | ○ | ○ | ○ |

TABLE 2

| | Alloy Composition (mass %) | | | | | | | Relationship (1) | Relationship (2) | Creep Resistance | Workability | Melting Point |
|---|---|---|---|---|---|---|---|---|---|---|---|---|
| | Sn | Ag | Cu | Ni | Sb | Bi | Co | P | | | | | |
| Comparative Example 1 | Bal. | 5 | 0.7 | 0.06 | 6.0 | 0.5 | 0.008 | 0.003 | ○ | ○ | X | X | X |
| Comparative Example 2 | Bal. | 3.4 | 0 | 0.06 | 6.0 | 0.5 | 0.008 | 0.003 | ○ | ○ | X | ○ | ○ |
| Comparative Example 3 | Bal. | 3.4 | 1.5 | 0.06 | 6.0 | 0.5 | 0.008 | 0.003 | ○ | ○ | X | X | X |
| Comparative Example 4 | Bal. | 3.4 | 0.7 | 0 | 6.0 | 0.5 | 0.008 | 0.003 | X | ○ | X | ○ | ○ |
| Comparative Example 5 | Bal. | 3.4 | 0.7 | 0.5 | 6.0 | 0.5 | 0.008 | 0.003 | X | ○ | X | X | X |
| Comparative Example 6 | Bal. | 3.4 | 0.7 | 0.06 | 5.0 | 0.5 | 0.008 | 0.003 | ○ | ○ | X | ○ | ○ |
| Comparative Example 7 | Bal. | 3.4 | 0.7 | 0.06 | 10.0 | 0.5 | 0.008 | 0.003 | ○ | ○ | ○ | X | X |
| Comparative Example 8 | Bal. | 3.4 | 0.7 | 0.06 | 6.0 | 0 | 0.008 | 0.003 | ○ | ○ | X | ○ | ○ |
| Comparative Example 9 | Bal. | 3.4 | 0.7 | 0.06 | 6.0 | 5.0 | 0.008 | 0.003 | ○ | ○ | ○ | X | ○ |
| Comparative Example 10 | Bal. | 3.4 | 0.7 | 0.06 | 6.0 | 0.5 | 0 | 0.003 | ○ | X | X | ○ | ○ |
| Comparative Example 11 | Bal. | 3.4 | 0.7 | 0.06 | 6.0 | 0.5 | 0.5 | 0.003 | X | X | X | X | X |
| Comparative Example 12 | Bal. | 3.4 | 0.7 | 0.06 | 6.0 | 0.5 | 0.008 | 0 | ○ | X | X | ○ | ○ |
| Comparative Example 13 | Bal. | 3.4 | 0.7 | 0.06 | 6.0 | 0.5 | 0.008 | 0.3 | X | X | X | X | X |
| Comparative Example 14 | Bal. | 3.4 | 0.7 | 0.06 | 8.0 | 0.5 | 0.008 | 0.003 | ○ | ○ | ○ | X | ○ |

(Creep Resistance)

For the solder alloys with the alloy compositions shown in Tables 1 and 2, the minimum creep rate as an index of creep resistance was calculated from the results of a tensile test. The calculation method is as follows: More specifically, a tensile test (measurement device: universal tester 5966 (manufacturer: Instron)) was performed at room temperature and strain rates of 4 patterns ((A) 60 [mm/min], (B) 6 [mm/min], (C) 0.6 [mm/min], (D) 0.06 [mm/min]), and the minimum creep rate was calculated from the results. Further, as for the dimensions of the test piece, the distance between gauge marks was 30 mm, and the diameter of the parallel part was 8 mm.

The measurement results are shown in the column of creep resistance in Tables 1 and 2. In Tables 1 and 2, the sample of $10^{-6}$%/sec or less in minimum creep rate was rated as "o", the sample of $10^{-7}$%/sec or less in minimum creep rate was rated as "⊙", and the sample in excess of $10^{-6}$%/sec in minimum creep rate was rated as "x".

(Workability)

The solder alloys with the alloy compositions shown in Tables 1 and 2 were subjected to processing by hot rolling. The availability of the rolling is shown in the column of workability in Tables 1 and 2. In Tables 1 and 2, the sample available for rolling to a thickness of 0.5 mm without any edge cracking was rated as "⊙", the sample available for rolling down to a thickness of 1 mm without any edge cracks generated was rated as "o", and the sample with edge cracking generated in the case of rolling to a thickness of 1 mm was rated as "x".

(Melting Point)

For the solder alloys with the alloy compositions shown in Tables 1 and 2, the solidus temperature and liquidus temperature were measured by a differential scanning calorimetry (DSC: Differential Scanning Calorimetry) method with the use of EXSTAR 6000 (manufacturer: Seiko Instruments Inc.). The solidus temperature was measured by a method in accordance with JIS Z 3198-1. The liquidus temperature was measured by the same DSC method as the method for measuring the solidus temperature in accordance with JIS Z 3198-1 without employing JIS Z 3198-1.

The measurement results are shown in the column of melting point in Tables 1 and 2. In Tables 1 and 2, the sample with the liquidus temperature of 240° C. or lower was rated as "⊙", the sample with the liquidus temperature of 250° C. or lower was rated as "o", and the sample with the liquidus temperature higher than 250° C. was rated as "x".

As can be seen from Table 1, the solder alloys (Example 1 to 19) with the alloy compositions consisting of, in mass %, Ag: 0 to 4%, Cu: 0.1 to 1.0%, Ni: 0.01 to 0.3%, Sb: 5.1 to 7.5%, Bi: 0.1 to 4.5%, Co: 0.001 to 0.3%, P: 0.001 to 0.2%, and the balance being Sn has creep resistance of "⊙" or "o" and workability of "⊙" or "o".

In contrast, as can be seen from Table 2, the solder alloy with the Ag content of 5% or more (Comparative Example 1), the solder alloy with the Cu content of less than 0.1% (Comparative Example 2), the solder alloy with the Cu content in excess of 1.0% (Comparative Example 3), the solder alloy with the Ni content of less than 0.01% (Comparative Example 4), the solder alloy with the Ni content in excess of 0.3% (Comparative Example 5), the solder alloy with the Sb content of less than 5.1% (Comparative Example 6), the solder alloys with the Sb contents in excess of 7.5% (Comparative Examples 7 and 14), the solder alloy with the Bi content of less than 0.1% (Comparative Example 8), the solder alloy with the Bi content in excess of 4.5% (Comparative Example 9), the solder alloy with the Co content of less than 0.001% (Comparative Example 10), the solder alloy with the Co content in excess of 0.3% (Comparative Example 11), the solder alloy with the P the content of less than 0.001% (Comparative Example 12), and the solder alloy with the P content in excess of 0.2% (Comparative Example 13) have either one or both of the creep resistance and workability rated as "x".

Accordingly, the alloy composition of the solder alloy is adjusted to an alloy composition consisting of, in mass %, Ag: 0 to 4%, Cu: 0.1 to 1.0%, Ni: 0.01 to 0.3%, Sb: 5.1 to 7.5%, Bi: 0.1 to 4.5%, Co: 0.001 to 0.3%, P: 0.001 to 0.2%, and the balance being Sn, thereby allowing a solder alloy with excellent creep resistance and favorable workability to be provided.

Furthermore, as can be seen from Table 1, in the case where the alloy composition of the solder alloy satisfies the above-described relationships (1) and (2) at the same time, the creep resistance, the workability, and the melting point are all rated as "⊙".

Accordingly, the alloy composition of the solder alloy is designed so as to satisfy the above-described relationships (1) and (2) at the same time, thereby making it possible to provide a solder alloy further improved in all respects of creep resistance, workability, and melting point.

Although the embodiments and the modified examples have been described above by way of example, the scope of the present technology is not to be considered limited thereto, and can be changed and modified depending on the purpose within the scope specified in the claims. In addition, the respective embodiments and modified examples can be appropriately combined within the range that is consistent with processing details.

What is claimed is:

1. A solder alloy having an alloy composition consisting of, in mass %, Ag: 0 to 4%, Cu: 0.1 to 1.0%, Ni: 0.01 to 0.3%, Sb: 5.1 to 7.5%, Bi: 0.1 to 4.5%, Co: 0.001 to 0.3%, P: 0.001 to 0.2%, and a balance being Sn, wherein the alloy composition satisfies the following relationships (1) and (2):

$$0.50 \leq (Ag+Cu) \times (Sb+Bi) \times (Ni+Co+P) < 7.0 \quad (1)$$

$$0.17 \leq Co/P \leq 65 \quad (2)$$

wherein, in relationships (1) and (2), Ag, Cu, Sb, Bi, Ni, Co, and P each represent the content in mass % thereof in the alloy composition, and wherein:

a minimum creep rate of the solder alloy calculated based on a tensile test performed at room temperature and at strain rates of 60 mm/min, 6 mm/min, 0.6 mm/min, and 0.06 mm/min is $10^{-7}$%/sec or less, a workability of the solder alloy based on hot roll processing results in rolling to a thickness of 1 mm or less without generating cracks in an edge of the solder alloy, and a liquidus temperature of the solder alloy is 250° C. or less.

2. A preform comprising the solder alloy according to claim 1.

3. A paste comprising the solder alloy according to claim 1.

4. A solder joint comprising the solder alloy according to claim 1.

* * * * *